Patented May 16, 1950

2,507,519

UNITED STATES PATENT OFFICE 2,507,519

ORGANOSILOXANES

John T. Goodwin, Jr., Midland, Mich., assignor to Dow Corning Corporation, Midland, Mich., a corporation of Michigan No Drawing. Application March 19, 1949, Serial No. 82,477

6 Claims. (Cl. 260—46.5)

The present invention relates to new organosilicon copolymers and their production.

The present organosilicon industry is based upon siloxanes which are materials in which the silicon atoms are linked through oxygen atoms. Another type of silicon compound is one in which the silicon atoms are linked directly to each other. Still a third type is one in which the silicon atoms are linked by organic radicals. The copolymers prepared in accordance with the present invention contain siloxane linkages and methylene linkages.

The products of the present invention are siloxane copolymers which contain silicon atoms bonded to oxygen atoms of siloxane linkages, and silicon atoms all the bonds of which are satisfied by carbon atoms. These copolymers contain an average of between 1.98 and 2.1 organic radicals per silicon atom of the type having oxygen atoms bonded thereto, over 50% of said organic radicals being methyl radicals. The remaining radicals are selected from the group consisting of [(CH$_3$)$_3$SiCH$_2$—] and

[(CH$_3$)$_2$C$_6$H$_5$SiCH$_2$—]

All remaining valences of the silicon atoms are satisfied by said siloxane linkages. At least 0.25% of said organic radicals are of the stated group.

The compositions produced in accord herewith which contain from 2 to 2.1 radicals, as above defined, are high molecular weight copolymers. The viscosity of these fluids ranges up to fluids which are elastic and non-flowing at room temperature, when there are two such radicals. That these materials are fluids can be shown by the fact that they are soluble in aromatic solvents such as toluene. When the polymers contain at least 1.98 radicals and less than 2, as defined, the polymers are cross-linked solids and are elastic.

These products may be produced by various methods. Thus, a chloromethyl methyl polysiloxane may be reacted with trimethyl or dimethyl phenyl silicon chloride using sodium by a Wurtz reaction. Alternatively, they may be produced by the hydrolysis of compounds of the type R(CH$_3$)$_2$SiCH$_2$SiCH$_3$Y$_2$ and of the type (CH$_3$)$_2$SiY$_2$, where each R is a radical of the group consisting of methyl and phenyl radicals and each Y is a substituent of the group consisting of alkoxy radicals and halogen atoms. The reactants, R(CH$_3$)$_2$SiCH$_2$SiCH$_3$Y$_2$ and (CH$_3$)$_2$SiY$_2$ may be mixed, cohydrolyzed and cocondensed by known methods. In such a process the reaction may be carried out either with or without a catalyst present and in the presence or absence of a solvent. The reactants R(CH$_3$)$_2$SiCH$_2$SiCH$_3$Y$_2$ and (CH$_3$)$_2$SiY$_2$ may be hydrolyzed separately and the compounds

[R(CH$_3$)$_2$SiCH$_2$SiCH$_3$O—]$_n$ and [(CH$_3$)$_2$SiO]$_x$ so produced may be mixed and copolymerized by contacting them with fuming sulfuric acid. A solvent may be used if desired.

The preparation of the reactant

R(CH$_3$)$_2$SiCH$_2$SiCH$_3$Y$_2$ is illustrated by the reaction of (CH$_3$)$_3$SiCl and ClCH$_2$CH$_3$Si(OC$_2$H$_5$)$_2$ by contacting the two with sodium which method is fully disclosed in my copending application, Serial No. 82,480, filed March 19, 1949.

In order to obtain the slight deviations defined from 2 radicals per siloxane silicon (those which have oxygen bonded thereto), minor proportions of methylsilsesquioxane or trimethylsiloxane may be included as units in the copolymer.

Those copolymers of the present invention which contain from 2 to 2.1 radicals are of a wide range of utility. They are of considerable utility as lubricants since they remain fluid down to —70° to —75° C. The products are also of importance as damping media, hydraulic fluids, and as liquid dielectrics. They may be thickened by the addition of fillers such as silica aerogel for use as electric sealing compounds. They are also useful in treating surfaces to make them water-repellent.

Those copolymers which contain from 1.98 to less than 2 radicals per siloxane silicon and those which contain 2 such radicals are likewise of utility for the production of silicone rubber. Thus the copolymers described may be mixed with from 2 to 8 parts of benzoyl peroxide or t-butyl perbenzoate per 100 parts of base polymer, and if desired with from 50 to 300 parts of filler. Fillers such as titania, zinc oxide, iron oxide, silica, and the like may be employed. This mixture after milling may be heated to a temperature between 100° and 300° C. to effect vulcanization. The vulcanization may be effected under pressure in order to obtain a solid rubber. One may use either a rubber press or vulcanize in an atmosphere of high pressure steam. Alternatively the vulcanization may be effected at atmospheric pressure with room for expansion whereby a sponge rubber is obtained.
The following examples illustrate the methods of the present invention.

Example 1

133 parts by weight of $[(CH_3)_2SiO]_4$, 29 parts of

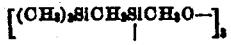

and 3.2 parts of $[(CH_3)_3Si]_2O$ were mixed. 6.4 parts of 30% fuming sulfuric acid were added, and the mixture allowed to stand. Then 3.2 parts of $H_2O$ were added and the mixture stirred. After standing overnight the polymer was washed, dried with $Na_2SO_4$, filtered and devolatilized. This polymer was found to have a melting point of $-69°$ C., a viscosity at 25° C. of 289 cs., a refractive index of 1.4097 at 25° C., a density of 0.9611 at 25° C., a specific refraction of 0.2576 and a molecular weight of 3970.

Example 2

200 parts by weight of $[(CH_3)_2SiO]_4$, 44 parts of

and .244 part of $[(CH_3)_3Si]_2O$ were mixed. 10 parts of 30% fuming sulfuric acid were added and the mixture allowed to stand. Then 5 parts of $H_2O$ were added and the mixture stirred. After standing overnight the polymer was diluted with benzene and washed with $H_2O$. Nitrogen gas was then bubbled through and vacuum applied at 70° C. This polymer was found to have a viscosity at 99° C. of 6920 cs.

Example 3

200 parts by weight of $[(CH_3)_2SiO]_4$, 2 parts of

and 2 parts of $[(CH_3)_3Si]_2O$ were mixed. 10 parts of 30% fuming sulfuric acid were added and the mixture allowed to stand. Then 5 parts of $H_2O$ were added. The reaction was conducted as in Example 2. The polymer was found to have a viscosity at 25° C., of 387 cs., a refractive index of 1.4035 at 25° C., a density of 0.9668 at 25° C., a specific refraction of 0.2527 and a molecular weight of 3970. After devolatilization, it was found that the polymer had a melting point of $-50°$ C., a viscosity at 25° C. of 2174 cs., a refractive index of 1.4118 at 25° C., a density of 0.9650 at 25° C., a specific refraction of 0.2533 and a molecular weight of 6200.

Example 4

37 parts by weight of $[(CH_3)_2SiO]_4$, 73 parts of

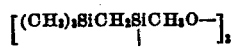

and 1.1 parts of $[(CH_3)_3Si]_2O$ were mixed. 4 parts of 30% fuming sulfuric acid were added and the mixture allowed to stand. Then 2 parts of $H_2O$ were added. The reaction was conducted as in Example 2. This polymer was found to have a viscosity at 25° C., of 46 cs., a refractive index of 1.4327 at 25° C., a density of 0.9406 at 25° C., and a specific refraction of 0.2761. After devolatilization the polymer was found to have a melting point of $-74°$ C., a viscosity at 25° C. of 67 cs., a refractive index of 1.4340 at 25° C., a density of 0.9432 at 25° C., a specific refraction of 0.2761, and a molecular weight of 1070.

Example 5

444 parts by weight of $[(CH_3)_2SiO]_4$, 98 parts of

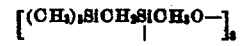

and .5 part of $[(CH_3)_3Si]_2O$ were mixed. 22 parts of 30% fuming sulfuric acid were added, and the mixture allowed to stand. Then 11 parts of $H_2O$ were added and the mixture stirred. After standing overnight the polymer was washed, dried with $Na_2SO_4$, and filtered. This polymer had a viscosity at 99° C. of 12,770 cs. The melting point was $-65°$ C.

Example 6

109 parts by weight of

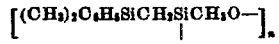

and 597 parts of $[(CH_3)_2SiO]_4$ were mixed. 28 parts of 30% fuming sulfuric acid were added, the mixture stirred and allowed to stand. Then 14 parts of $H_2O$ were added and the mixture stirred until it became semi-solid. After standing overnight, the high polymer was dissolved in benzene, washed free of acid with water, and dried by bubbling nitrogen gas through while maintaining the temperature at 70°–80° C. The polymer was non-flowing at room temperature and was soluble in benzene.

Example 7

A mixture of 66.1 parts by weight of cyclic $[(CH_3)_2SiO-]_3SiO(CH_3)CH_2Cl$ and 21.7 parts of $(CH_3)_3SiCl$ was reacted with 9.2 parts of sodium. Distillation gave a 75% yield of the product.

$[(CH_3)_2SiO-]_3SiOCH_3[CH_2Si(CH_3)_3]$

This compound had a boiling point of 121° C. at 25 mm., a refractive index of 1.4137 at 25° C., a density of 0.9475 at 25° C., and a specific refraction of 0.2665.

Example 8

133.2 parts of $[(CH_3)_2SiO]_4$ and 41 parts of cyclics of the type

were mixed. 7 parts of 30% fuming sulfuric acid were added and the mixture allowed to stand. Then 3.5 parts of $H_2O$ were added, the mixture stirred, and allowed to stand overnight. A viscous polymer was obtained. It was dissolved in benzene and washed with $H_2O$. Nitrogen gas was bubbled through at 80° C. The resulting product was a viscous semi-solid soluble polymer.

A rubber was prepared from this polymer by milling 100 parts of the polymer with 100 parts of titania and 4 parts of t-butyl perbenzoate. The milled material was vulcanized in a rubber press for 15 minutes at 150° C. under 400 pounds per square inch pressure. The product was a strong, tough rubber.

Example 9

597 parts by weight of $[(CH_3)_2SiO]_4$ and 109 parts of

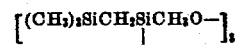

were mixed. 28 parts of 30% fuming sulfuric acid were added and the mixture allowed to stand. 14 parts of $H_2O$ were then added. The polymer was dissolved in benzene and washed several times with $H_2O$. Nitrogen gas was then bubbled through and the vacuum applied at 70° C. The polymer was non-flowing at room temperature and was soluble in benzene.

A rubber was prepared from this polymer by milling 100 parts of the polymer with 100 parts of $TiO_2$ and 4 parts of t-butyl perbenzoate. The milled material was vulcanized in a rubber press for 15 minutes at 150° C. This elastomer had a tensile strength of 279 pounds per square inch and an elongation of 525 per cent at break.

*Example 10*

A rubber was prepared from the polymer of Example 9 by milling 100 parts of the polymer with 100 parts of ZnO, 100 parts of $TiO_2$, and 3 parts of benzoyl peroxide as a catalyst. The milled material was then vulcanized and cured for 4 hours at 250° C. This elastomer had a tensile strength of 405 pounds per square inch and an elongation of 327 per cent at break.

That which is claimed is:

1. A siloxane copolymer which copolymer contains silicon atoms bonded to oxygen, and silicon atoms all the bonds of which are satisfied by carbon, and which copolymer contains an average of between 1.98 and 2.1 organic radicals per silicon atom of the type having oxygen atoms bonded thereto, over 50% of said organic radicals being methyl radicals, the remaining radicals being selected from the group consisting of $[(CH_3)_3SiCH_2-]$ and $[(CH_3)_2C_6H_5SiCH_2-]$ the remaining valences of the silicon atoms being satisfied by siloxane linkages, and which copolymer contains at least 0.25% of said organic radicals of the stated group.

2. A siloxane copolymer in accordance with claim 1 in which said remaining radicals are $[(CH_3)_3SiCH_2-]$.

3. A siloxane copolymer in accordance with claim 1 in which said remaining radicals are $[(CH_3)_2C_6H_5SiCH_2-]$.

4. The method which comprises copolymerizing a mixture of cyclic polymers of the formulas $$[R(CH_3)_2SiCH_2SiCH_2O-]_n$$

and $[(CH_3)_2SiO]_n$, where R is a radical of the group consisting of methyl and phenyl radicals and $n$ is a positive integer, by contacting said mixture with fuming sulfuric acid, whereby a siloxane copolymer is produced.

5. The method in accord with claim 4 in which a siloxane is copolymerized therewith, which contains $(CH_3)_3SiO_{0.5}$ units.

6. The process of preparing elastomeric materials from a siloxane copolymer which copolymer contains silicon atoms bonded to oxygen, and silicon atoms all the bonds of which are satisfied by carbon, and which copolymer contains an average of between 1.98 and 2 organic radicals per silicon atom of the type having oxygen atoms bonded thereto, over 50% of said organic radicals being methyl radicals, the remaining radicals being selected from the group consisting of $[(CH_3)_3SiCH_2-]$ and $[(CH_3)_2C_6H_5SiCH_2-]$, the remaining valences of the silicon atoms being satisfied by siloxane linkages, and which copolymer contains at least 0.25% of said organic radicals of the stated group, which process comprises compounding 100 parts of the siloxane copolymer with from 50 to 300 parts of a filler and from 2 to 8 parts of a catalyst selected from the group consisting of benzoyl peroxide and t-butyl perbenzoate, and vulcanizing the compounded material by heating it between 100° and 300° C.

JOHN T. GOODWIN, Jr.

REFERENCES CITED

The following references are of record in the file of this patent:

Goodwin et al., J. Am. Chem. Soc., vol. 69, September 1947, page 2247.